UNITED STATES PATENT OFFICE.

JOKICHI TAKAMINE, OF NEW YORK, N. Y.

PROCESS FOR PRODUCING DIASTATIC PRODUCT.

1,263,817.     Specification of Letters Patent.     Patented Apr. 23, 1918.

No Drawing. Original application filed January 28, 1913, Serial No. 744,609. Divided and this application filed August 11, 1916. Serial No. 114,336.

*To all whom it may concern:*

Be it known that I, JOKICHI TAKAMINE, a subject of the Emperor of Japan, and a resident of New York city, borough of Manhattan, in the county and State of New York, have invented a new and useful Process for Producing Diastatic Product, of which the following is a specification.

In the production of koji and moyashi as described in my Letters Patent of the United States numbered 525,820, 525,322 and 525,823, and in my application No. 541,617, filed February 2, 1910, the *Aspergillus oryzae* spores are mixed with the culture medium such as wheat bran moistened with water. Heretofore, it was supposed that quietude was essential to efficient growth because it was supposed that the superficially sowed spores would be displaced by movement of the culture medium.

I have discovered, however, that a certain amount of motion is not only permissible but very advantageous, since it not only does not interfere with the growth, but actually accelerates it and enables large economies to be had in the operation. I have also discovered that when produced in motion, the mycelial growth is different, the filaments being shorter and thicker and the number of branches being greatly increased, thereby increasing the number of ends for heading out in moyashi spores.

Before my present invention, it was the custom to spread the culture medium loosely to a thickness of not exceeding three or four inches, thereby giving the air access to as large a surface as practicable. This not only required an enormous floor space, but made unavoidable the infection of the mass by foreign fungi and bacteria settling down upon it from the air. The labor and expense of installing and operating the apparatus in consequence of the trays on which the culture medium was spread, were also items in which improvement was urgent.

By the use of my present invention, the mass may be several feet in thickness—say three or four feet—or even more, while in the old process a thickness of three or four inches was the maximum, and even at that thickness the growth of the fungus was not as satisfactory as that carried on with a thickness of one to two inches.

In practising my present invention, the mass is agitated continually so that the particles of the mass will be brought to the surface in succession in order to have access to the air. This agitation, however, is not of such violence as to substantially impede the fungus growth though it modifies the character of the mycelial filaments thereof. The agitation is such as to cause the particles to go through a cycle of movement not to exceed about once or twice per minute, by preference, and although this speed of agitation may be increased considerably, I have found that when it reached ten cycles per minute, the growth was materially impeded.

An apparatus for carrying out the process herein described and claimed is disclosed in my application, filed January 28, 1913, Serial No. 744,609, of which this application is a division.

The present invention consists in the improved process which I will now describe.

Sufficient culture medium which may be in the nature of bran from cereals is introduced into a drum to a depth of about three or four feet. This culture medium preferably consists of wheat bran, although I may employ other mediums which will present the desired surface for the growth of the fungi. I do not, however, limit myself to these substances since I believe that any substance which at the same time presents sufficient surface and affords sufficient nutriment for the fungi may be employed for the culture medium.

Water is sprayed upon the culture medium, the flow of water being permitted to continue until the bran is moistened to the desired degree, for example, so as to contain from about thirty to forty parts of water, or less, by weight, to one hundred parts of bran. During this spraying the drum may be revolved slowly so that the culture medium will be tumbled therein to insure all parts of the mass of the said medium being properly and evenly moistened. The flow of water is then cut off and steam is admitted to the drum also during rotation of the latter for the purpose of sterilizing the medium to destroy such bacilli as might be detrimental or harmful in the production of the fungi. This step of sterilization by steam may continue for from one to two hours, and may be less if the drum is steam-tight and high pressure steam is used.

Upon completion of sterilization a current of air, preferably cooled, is passed through the drum in contact with the culture medium, the purpose being to cool the medium down to a temperature best suitable for the germination and growth of the fungus. I may, and preferably do, cool the air, and may modify it in order that the temperature of the medium may be reduced to the proper point, and at the same time the moisture therein afforded by the step first described will now be drawn off or reduced by the current of air passing through the drum.

I then treat the culture medium with an antiseptic of the nature which will prevent the growth of foreign bacilli or detrimental fungus on the culture medium, or will destroy bacilli which would prevent the proper germination of the diastase producing substance thereon. This antiseptic may consist of one or more substances, but I have found that a combination of sodium fluorid, salicylic acid, or benzoic acid combined in proportion of 10 parts of the fluorid to 17 parts of the salicylic acid or benzoic acid serves the desired purpose. This compound is employed in proportion of about one part of the antiseptic to 300 to 1000 parts of the culture medium, it being usual to employ it in about the proportion of 1 to 1000 by weight. The antiseptic is placed in water and forced into the interior of the drum and sprayed upon the culture medium. I may force the antiseptic through suitable straining or filtering devices to remove foreign substances which might be detrimental to the proper growth of the diastase bearing fungus. During the spraying of the antiseptic into the drum, the latter is revolved at a suitable speed for a sufficient time to overturn or tumble the culture medium and cause the sprayed antiseptic to be disseminated thoroughly throughout the mass. I do not desire to be limited to the use of the particular antiseptic or antiseptics described as I may use formaldehyde in the proportion of about one part or less by weight of the formaldehyde to 3000 parts of the moist medium. Or I may use hydrofluoric, benzoic or salicylic acid, under which conditions I employ hydrofluoric acid in the proportion of 1 to 2000 parts by weight of the moist culture medium, and benzoic or salicylic acid in the proportion of 1 to 500 to 1000 parts of the moist culture medium. I may also employ a mixture of acid sodium fluroid and sodium salicylate or sodium benzoate under the same conditions as existing when using the combination of sodium fluroid and salicylic or benzoic acid.

After it has been ascertained that the antiseptic employed has been thoroughly mixed with the culture medium, I add *Aspergillus oryzae* in the form of spores and known as moyashi, and preferably suspended in water, to the culture medium, the moyashi and water being sprayed into the drum under pressure and onto the culture medium. Under conditions of manufacture I employ the moyashi in the proportion of about one part of the spores to 2000 parts, by weight, of the culture medium. The water bearing the moyashi spores is preferably passed through strainers on its way to the nozzle so as to remove any foreign substances which might interfere with the proper growth of the fungi.

The drum may then be permitted to rest for a period of from ten to twelve hours for preliminary germination, or it may be rotated slowly, say at the rate of about once in five minutes, for this period. After this preliminary rest or slow agitation the drum is then rotated for a period of from thirty to forty hours at the rate of one revolution for every one to three minutes, which period is usually sufficient for complete germination of the diastase bearing product, which in the present instance is a koji.

In the preliminary cooling the temperature of the air is so regulated that when the antiseptic in water and the moyashi in water are added the temperature of the moist medium will be reduced to about 30° C. It may be that the generation or growth of the fungus under ordinary circumstances would increase the temperature of the mass to 40° or 42° C., but by regulating the flow of air through the drum by the way of trunks this temperature can be maintained down to near the optimum point of the fungus growth which lies near 30 C. The temperature of from 35° to 38° C. does not materially affect the quality of the final product nor the time of completing the process, and it is preferred to keep the mass at about this temperature since any effort to maintain the temperature nearer to 30° C. may frequently result in accidentally going below that temperature and thereby impeding the growth of the fungus. When the drum has been rotated for the period of thirty to forty hours referred to, the whole mass will be permeated with a growth of fungus, which, on the surface, does not show such a silky luster as is found by growing the fungi with the culture medium at rest, but, on the contrary, shows shorter and thicker filaments and a much greater number of branches. The process is then complete and the mass of koji produced may be either dried in the drum, or after removal therefrom. It is exceedingly uniform in its diastatic power and is decidedly stronger than that produced by growing the fungi on material at rest in the ordinary way. In generating the new koji I prefer to use acclimatized moyashi spores, such as I have described in my United States Letters Patent No. 1,148,938, granted July 7, 1915, and produced by the process of said application, but it will be understood that in preparing this moyashi I may use the antiseptics herein described which are not mentioned in said Letters Patent No. 1,148,938.

It will be noted that all of the steps of the process herein set forth are carried out inside the drum so that the chances of the mass becoming contaminated are greatly reduced, and the diastase bearing substance is permitted to grow under the best conditions of disinfection. In the final treatment when the moyashi is added to the medium I prefer, for best results, to revolve the drum from the time the moyashi has been added, but for economy and power it may be rested for from four to ten hours as above described.

During revolution of the drum, baffles may be employed therein to carry the bottom portion of the mass of culture medium up and tumble it over the top of the mass whence it gravitates or tumbles to the bottom of the drum, so that fresh portions of the spore bearing mass are continuously presented to the action of the air current, it being understood that it is highly desirable for best results that the mass be continuously presented to the air current.

The moyashi spores employed herein from which the koji or diastase bearing substance is grown are preferably prepared, as a part of the complete process herein described and sought to be covered, so as to be acclimatized or immune to the antiseptic with which the culture medium is treated before the spores are sowed thereon and in presence of which the koji is grown. This moyashi may be produced from *Aspergyllus oryzae* according to the method described in my said Letters Patent No. 1,148,938, by growing repeated generations of the same in presence of increasing proportions of an antiseptic, and I find that in producing the koji it is preferable to use a moyashi which has been acclimatized to the same antiseptic which is employed in the growing of the koji, that is, in carrying out the present process using sodium fluorid and salicylic acid as the antiseptic for the koji I prefer to grow the moyashi so as to be acclimatized according to my said process described in my said Letters Patent No. 1,148,938 by the use of an antiseptic composed of sodium fluorid and salicylic acid. However, when using the antiseptics referred to in said application, I would employ the corresponding antiseptics set forth in this application.

It will be understood, however, that I may employ the method of procedure described herein for growing the generations of the moyashi spores, in which event it is only necessary to continue the period of incubation until the koji heads out into spores having a yellowish appearance, which distinguishes the moyashi from the koji, the latter being the product of a stage reached by the mycelial growth of the fungus prior to heading out into a sporophore (or spore bearer), at which state it has a white silky appearance which distinguishes it as koji.

In order to increase the diastatic yield of the fungus, I prefer to use salt water for moistening the medium. If salt water be employed, the amount of the salt, say sodium chlorid, may be in the proportion of about from $\frac{1}{2}$ of 1% to 1% of the dry medium. When salt is employed the medium to be used should be neutral or slightly acid, since alkalis or ammonia bases, organic or inorganic, are prejudicial to the diastatic enzym secreted by the fungus growth. If the medium is acidulated with any organic acid, such as acetic, tartaric, citric acid, etc., even such an amount as 1% of the medium, calculated as dried matter, does not materially injure the strength of the diastase formed with the growth of the fungus. Inorganic acids are, as a rule, prejudicial to diastase and they should be avoided for use except in a quantity not exceeding $\frac{1}{10}$ of 1% of the medium, calculated as dried matter. Phosphoric acid, however, does not do much injury to the diastatic strength and can be used even to $\frac{1}{2}$ of 1% of the medium, calculated as dried matter. Acidity of the medium is more favorable for the fungus growth compared to the neutral medium, therefore, in practice more or less acidity is maintained in the medium.

The following procedure may be carried out for removing the diastase from the koji produced by the above method:

From the dried or undried (preferably undried) koji mass obtained according to either of the foregoing examples, the soluble ferment is extracted by treating the same with water or water mixed with alcohol. This may be done by permitting the liquid to percolate through the mass, or by steeping the mass in the liquid. The strength of this solution may be increased by repeatedly treating a fresh quantity of the mass therewith. A solution containing from thirty to thirty-five per cent. of soluble solid matter may thus be readily obtained. The object of making the extract of such great strength as above described is to economize the quantity of alcohol to be used in the subsequent stage of the process described below. In order to further economize the alcohol to be used, I may also further concentrate the already strong extract by evaporation by suitable means at a temperature not to exceed 50° C., that is, at a temperature at which the diastatic enzym is not injured; so as to form a thick syrup or semi-solid. In this concentrated state also the water extract of the crude enzym can be preserved without change, before precipitation with alcohol; and consequently precipitation with alcohol is not required to be immediately proceeded with, as would be the case if a weak watery extract were prepared. This solution may be still further concentrated and strengthened by evaporation at a low temperature into a syrupy form. To the solution thus obtained, a sufficient quantity, which is usually about one and a half to three times its volume of alcohol containing from 90 to 95% absolute alcohol, by volume, is added and agitated until the diastatic enzym is precipitated. Flocculent solid matter or not infrequently a sticky mass consisting mainly of diastatic enzym, but also of some percentage of dextrin, mineral matter, etc., is precipitated. The precipitate may be allowed to settle, and is separated from the supernatant liquid by decantation and filtration or it may be wholly separated by filtration. It is then washed with alcohol containing 85% of absolute alcohol to free it from adhering materials. The mass can be dried slowly at a low temperature in a dry room, preferably in a vacuum drier suitable for the purpose, or may be dehydrated by strong alcohol, by which latter means the article can be at once obtained in a powdery form. When dehydration is carried on by the latter means it is preferable to employ the extract in less concentration disregarding the economization of alcohol. The concentration in such case is found to be the best when the solid extractive matter amounts to 15 to 20 parts of the fluid. The article may be purified further by redissolving it in water, and re-precipitating and washing it with alcohol and drying, thus repeating the process as above followed out in the first precipitation. The article thus obtained is an amorphous dry mass, or powder, of almost white or light yellowish brown color. It is readily soluble in water and possesses the power of transforming gelatinized starch into sugar.

The article is distinguished from malt diastase by its very, very slight presentation of the characteristic property of giving blue coloration with the tincture of guaiacum mixed with hydrogen peroxid.

In place of the sodium chlorid, I believe that I may substitute some other salt, such for example, as sodium fluorid or other halids of alkalis or alkaline earths. I, therefore, employ the word "salt" herein in its broad generic sense to include any of these substances or equivalents compatible with a neutral or slightly acid condition during the progress of the growth.

According to my experiments, the use of the sodium chlorid in the process does not appear to appreciably increase the diastatic strength of the koji, but the presence of the sodium chlorid with the koji greatly increases the yield of the soluble enzym. At the same time, the use of the salt does not appear to increase the percentage of inorganic substance in the soluble enzym.

Where the acclimatized koji is employed in making the soluble enzym, I have found the diastatic strength to be more than double that heretofore obtainable, while the inorganic contents were very much less and when sodium chlorid was employed in making the new koji, I have found the yield of the product materially increased while the inorganic contents in the enzym produced were very much less.

I believe that I am the first one to discover or produce a fungus for enzyms having starch converting (i. e., converting starch into sugar) power, and at the same time substantially immune from the action of a proportion of antiseptic incompatible with the growth of other fungi or bacteria.

My new product in any of its forms may be recognized by possession of the following characteristics in combination; namely, it possesses diastatic power and when tested in comparison with ordinary fungus of the same species it displays an abnormal resistance to the influence of an antiseptic, such as those herein set forth.

The amount of water used in the antiseptic solution and for carrying the moyashi is so regulated that, together with the water used to moisten the medium, the proportion of the total amount of water to the medium will be from 60 to 80 parts of water by weight to 100 parts of bran.

What I claim and desire to secure by Letters Patent of the United States is:

1. The improvement in the manufacture of diastase producing substances which consists in growing fungi for enzyms having starch converting power in the presence of a mixture of sodium fluorid and salicylic acid.

2. The improvement in the manufacture of diastase producing substances which consists in growing fungi for enzyms having starch converting power in the presence of a mixture of sodium fluorid and salicylic acid in the proportion of 10 parts of sodium fluorid to 17 parts of salicylic acid.

3. The improvement in the manufacture of diastase producing substances which consists in growing fungi for enzyms having starch converting power on a culture medium, in the presence of an antiseptic containing sodium fluorid and salicylic acid in the proportion of 10 parts of sodium fluorid to 17 parts of salicylic acid, said antiseptic being in proportion of 1 part of antiseptic to 500 to 1000 parts of the culture medium.

4. The process of manufacturing diastatic product which consists in placing a culture medium in an apparatus in the nature of a tumbling drum, moistening the medium, sterilizing the same, sowing diastatic spores on the medium, subjecting the medium to incubating conditions combined with antiseptic conditions, all of said steps being performed while the medium is subjected to normally continuous agitation.

5. The process of manufacturing diastatic product which consists in agitating a culture medium in an apparatus in the nature of a drum, and during agitation sowing diastatic spores in the medium, and subjecting the same to incubating conditions.

6. The process of manufacturing diastatic product which consists in placing a culture medium in an apparatus in the nature of a drum, spraying diastatic spores suspended in a liquid on the medium and agitating the medium under incubating conditions.

7. The process of manufacturing diastatic product which consists in placing a culture medium in an apparatus in the nature of a drum, spraying diastatic spores on the medium suspended in a liquid while agitating the medium under incubating conditions combined with antiseptic conditions.

8. The process of manufacturing diastatic product which consists in placing a culture medium in an apparatus in the nature of a drum, spraying a cooling medium on the medium, sterilizing the same by steam, spraying an antiseptic on the medium, spraying diastatic spores on the medium, and subjecting the medium to incubating conditions and agitation.

9. The process of manufacturing diastatic product which consists in placing a culture medium in an apparatus in the nature of a drum, spraying a cooling medium on the medium, sterilizing the same by steam, spraying an antiseptic on the medium, spraying diastatic spores on the medium, and subjecting the medium to incubating conditions and agitating by tumbling.

10. The process of manufacturing diastatic product which consists in placing a culture medium in an apparatus in the nature of a drum, spraying acclimatized diastatic spores on the medium, and agitating the medium under incubating conditions.

11. The process of manufacturing diastatic product which consists in agitating a culture medium in an apparatus in the nature of a drum and spraying an antiseptic and then spraying diastatic spores on the medium, and subjecting the same to incubating conditions and agitation.

12. The process of manufacturing diastatic product which consists in placing a culture medium in an apparatus in the nature of a tumbling drum, spraying diastatic spores carried by a liquid medium on the medium, and tumbling the medium under incubating conditions to secure air contact with the medium.

In testimony whereof I have hereunto signed my name in the presence of a witness.

JOKICHI TAKAMINE.

Witness:
DOROTHY M. LANG.